(12) United States Patent
Sellers

(10) Patent No.: US 6,908,094 B1
(45) Date of Patent: Jun. 21, 2005

(54) HEAVY DUTY TOWING HITCH

(76) Inventor: Howard E. Sellers, P.O. Box 398, Milford, IN (US) 46542

(*) Notice: Subject to any disclaimer, the term of this patent is extended or adjusted under 35 U.S.C. 154(b) by 0 days.

(21) Appl. No.: 10/761,633

(22) Filed: Jan. 21, 2004

Related U.S. Application Data

(60) Provisional application No. 60/443,038, filed on Jan. 28, 2003.

(51) Int. Cl.[7] .............................................. B60D 1/00
(52) U.S. Cl. ................................................ 280/490.1
(58) Field of Search ........................ 280/490.1, 491.5, 280/477, 511

(56) References Cited

U.S. PATENT DOCUMENTS

| | | | | |
|---|---|---|---|---|
| 3,400,949 A | * | 9/1968 | Kendall | 280/490.1 |
| 3,692,330 A | * | 9/1972 | Kendall | 280/402 |
| 4,033,601 A | * | 7/1977 | Lindahl et al. | 280/490.1 |
| 4,148,498 A | * | 4/1979 | Taylor, Jr. | 280/482 |
| 4,215,876 A | * | 8/1980 | Jacks | 280/483 |
| 5,358,269 A | * | 10/1994 | Jakeman et al. | 280/490.1 |
| 6,341,795 B1 | * | 1/2002 | Zerkel | 280/490.1 |
| 6,585,280 B1 | * | 7/2003 | Wiers | 280/468 |
| 6,663,133 B1 | * | 12/2003 | Rosenlund | 280/490.1 |

* cited by examiner

Primary Examiner—Lesley D. Morris
Assistant Examiner—Paul Royal, Jr.

(57) ABSTRACT

A tow hitch having a shell and a draw bar in which the draw bar fits into a channel formed on the shell such that the draw bar may be shifted along the entire length of the channel and either enter or exit on either end of the channel. The shell is adjusted for connection to a tow vehicle.

1 Claim, 2 Drawing Sheets

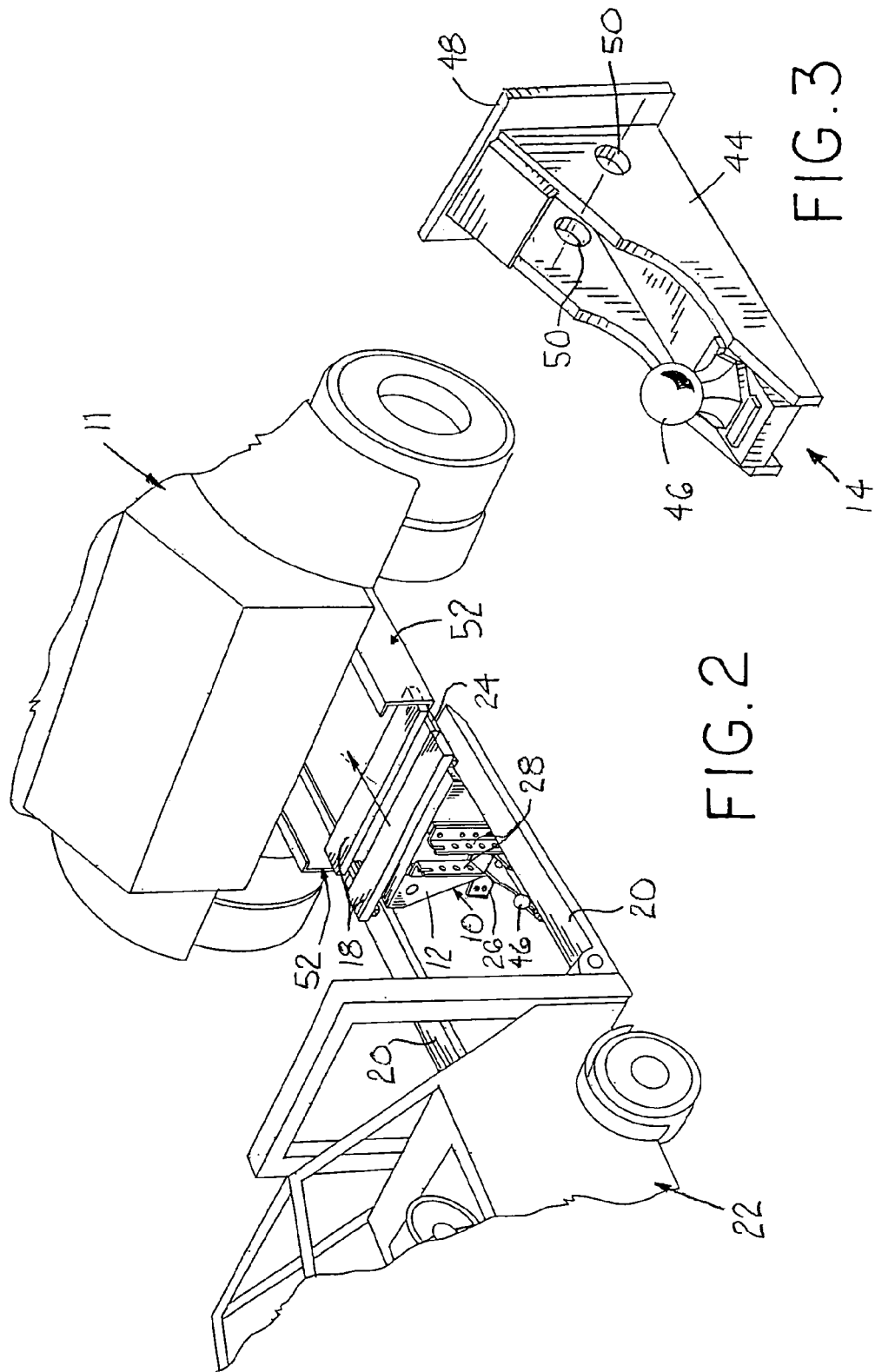

HEAVY DUTY TOWING HITCH

CROSS REFERENCE TO RELATED APPLICATIONS

This Application claims the benefit of Provisional U.S. patent application No. 60/443,038, filed 28 Jan. 2003.

BACKGROUND OF THE INVENTION

1. Field of the Invention

The invention disclosed herein relates to a towing hitch mountable on a tow vehicle to facilitate towing a trailer.

2. Discussion of Background Art

In the recreational vehicle and manufactured housing industries, it is often necessary to tow a very heavy load with a tow vehicle. In order to tow these loads, special tow vehicles, or tractors, are used that are specially adapted for towing the load. For example, in the manufactured housing (MH) industry, homes are towed from place to place by the manufacturer, and so a tow vehicle is specially adapted for towing the homes. One such adaptation includes a specialized towing hitch on the rear of the tow vehicle that accommodates towing the homes.

The specialized hitch that may be used by the MH manufacturer in the above example must often be able to accommodate large loads in excess of several tons. The same hitch must also be capable of allowing the trailer undercarriage for the MH to be vertically shifted at the hitch point in order to facilitate attaching and detaching the MH from the tow vehicle. At other times, such as during transport, the tow hitch must be able to maintain the trailer in a set position relative to the tow vehicle. Finally, it is desirable that the tow hitch be simple in design to reduce fabrication costs, facilitate installation, and reduce maintenance costs.

SUMMARY OF THE INVENTION

A tow hitch having a shell and a draw bar is presented wherein the draw bar fits into a channel defined on the shell such that the draw bar may be shifted along the entire length of the channel and enter or exit on either end of the channel. The shell is suitable for permanently affixing to a tow vehicle.

BRIEF DESCRIPTION OF THE DRAWINGS

These and other aspects of the invention will be apparent from the following description, with reference to the accompanying drawings, in which:

FIG. 2 depicts the towing hitch of FIG. 1 being installed on a tow vehicle;

FIG. 3 is an isometric view of the draw bar that mounts to the shell of the hitch.

DETAILED DESCRIPTION

Figure 1:
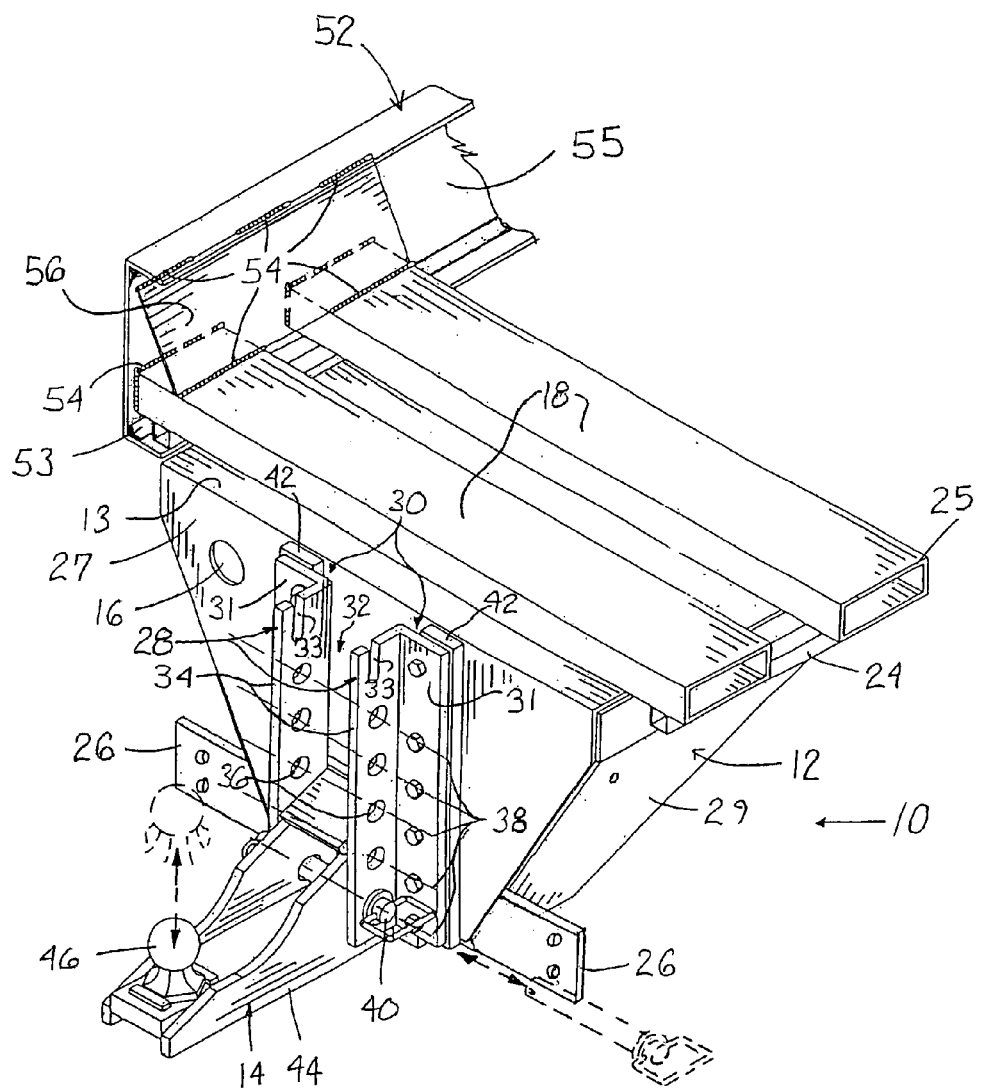
FIG. 1 is an isometric view of the towing hitch shown connected to a tow vehicle.

Referring to FIG. 1, a tow hitch 10 including a shell 12 and drawbar assembly 14. Shell 12 is made of welded steel plates as shown or any other sufficiently strong material and fasteners. Shell 12 shaped and sized to fit onto the rear of a towing vehicle 11. Access hole 16 in the rear of the shell 12 accommodates an electrical plug or wires (not shown) coming from the electrical system of the tow vehicle for connection to a complimentary plug or wires from the tow trailer or MH. Access hole 16 is sized such that electrical plug may be mounted within the access hole by any suitable means. Transversely mounted cross bars—or mounting braces 18— attached to the top wall 13 of the shell 12 are horizontally spaced parallel to each other so as to accept the forks 20 of a forklift 22 for moving the tow hitch 10 when mounting to the tow vehicle 11. Fit-up bars 24 or tubing are attached across the undersides of either end of the mounting braces 18 to aid in mounting the tow hitch to the tow vehicle. A pair of mounting tabs 26 extending in opposite directions away from the rear of the shell 12 may be added to the shell so as to be mountable to the tow vehicle for providing a stable mount, but are not used in the preferred embodiment.

A pair of hitch parts or braces 28 are attached to the rear wall 27 of the shell 12 to accept the draw bar 14. Side panels 29 extend between top wall 13 and rear wall 27 at each side of shell 12. Hitch braces 28 are a pair of vertically oriented parallel opposing angles each having an out-turned flange 34 and spaced facing flange 31. Aligned slots 33 may be defined at the top of each out turned flange 34 for carrying and securing a safety chain (not shown), but are not used in the preferred embodiment. Spacer plates 42 interposed between flanges 31 of hitch braces 28 and rear wall 27 provide the necessary spacing between the shell and the hitch braces for defining opposing hitch plate or side channels 30. Flanges 34 define a central draw bar channel 32 located between the opposing flanges of the hitch braces. A plurality of vertically spaced, aligned opposing pin holes 36 define a plurality of horizontal axis 38 through the opposing flanges 34 through which a hitch pin 40 may be inserted.

Draw bar 14 includes an arm 44 with a hitch 46 at one end and a hitch plate 48 at the opposite end. Hitch 46 may be a ball hitch as shown, or any other well-known hitch such as a clevis. Draw bar 14 is sized to fit with only slight clearance at arm 44 between opposing hitch brace flanges 34 in the draw bar channel 32. Hitch plate 48 extends outward from either side of draw bar arm 44 and fits into the opposing hitch plate channels 30. Hitch braces 28, draw bar arm 44, and hitch plate 48 are all aligned parallel to a vertical axis so as to allow draw bar 14 to freely move up and down along the vertical axis along the entire length of the hitch braces when not otherwise restrained. Thereby, draw bar 44 at its hitch plate 48 may be inserted into the channels 30 at the top of the hitch braces 28, slid along the entire length of the braces, and removed at the bottom of the braces. A hole 50 extending through draw bar 14 is sized and placed complimentary to opposing pairs of holes 36 through hitch brace flanges 34 such that hitch pin 40 may be inserted through an aligned set of holes 36 and 50 in the hitch brace flanges and draw bar arm 44 to prevent the draw bar 14 from moving vertically in relation to shell 12.

Referring to FIGS. 2 and 3, to install the tow hitch 10 to a tow vehicle 11, the forks 20 of a forklift 22 are positioned under mounting braces 18 and fit-up bars 24. Forklift 22 then moves the tow hitch 10 into position at the rear of tow vehicle 11 with fit-up bars 24 and mounting braces 18 fitted between opposing channels 52, which form a part of the chassis of the tow vehicle 11. Tow hitch 10 is positioned on tow vehicle 11 so that when draw bar 14 is mounted to the shell 12 at hitch braces 28, the hitch 46 is in a position ready to accept a complimentary hitch socket (not shown) extending from the MH. If used, mounting tabs 26 may be fitted against the tow vehicle 11 and attached thereto. Tow hitch 10 is then attached to tow vehicle 11 by welding 54. Bars 24 are inwardly spaced from the ends of mounting braces 18 so as to position the ends 25 of braces 18 above the radius 53 of channels 52. This allows the bar ends 25 to abut the webs 55 of channels 52 for welding. A mounting plate 56 extending at an angle between channel web 55 and mounting braces 18 is welded into position to add further stability.

In operation, tow vehicle 11 with tow hitch 10 securely mounted to its rear is positioned such that hitch 46 is in the approximate vicinity to a complimentary hitch socket (not shown) on the intended trailer or MH (not shown). Either tow vehicle or trailer is then maneuvered to facilitate connection of the complimentary hitch to the hitch socket.

Different tow trailers and MH's can have different ground clearances requiring different hitching elevations. Draw bar 14 may be adjusted vertically to accommodate such different hitch elevations. In order to do so, hitch pin 40 is removed from an aligned set of pin holes 36 and 50, draw bar 14 is shifted up or down as desired to align pin holes 50 on draw bar arm 44 with a different set of aligned pin holes 38 in hitch braces 28. Hitch pin 40 is then re-inserted through the new set of aligned pin holes 38 and 50. Draw bar 14 may also be completely removed from the tow hitch 10 if so desired by removing hitch pin 40 from aligned pin holes 38 and 50 and vertically sliding draw bar assembly 14 entirely out of the draw bar channel 32 and hitch plate channels 30. Draw bar assembly 14 may then be returned to the tow hitch 10 by re-inserting hitch plate 48 between the hitch plate channels 30 and sliding the draw bar assembly 14 along draw bar channel 32 until pin holes 50 in draw bar arms 44 are aligned with a pair of holes 38 in hitch braces 28. Hitch pin 40 is then inserted through the set of aligned holes 38 to hold draw bar assembly 14 in place until hitch pin 40 is removed at a later time.

The detailed description related herein is only meant to exemplify the preferred embodiment of the invention to enable those skilled in the art to make and use it. The subject invention is not to be limited to the details given above for the preferred embodiment, but may be modified within the scope of the impending claims.

I claim:

1. A towing hitch suitable for mounting to a tow vehicle for releasable connection to a trailer hitch; said towing hitch comprising a shell for attachment to said vehicle and a draw bar carried by said shell; said drawbar including a hitch part for attachment to said trailer hitch; said shell including a substantially vertical elongated receiver part having upper and lower ends for accepting said drawbar; said drawbar slidably shiftable along said receiver part; said drawbar being selectively securable to said shell at a plurality of vertically spaced locations between said ends along said receiver part;, said drawbar releasable from said shell at either of said ends; said shell including a rear wall; said receiver including a pair of vertically oriented, horizontally spaced, opposing flange parts carried by said rear wall; said flange parts defining a central channel therebetween; each of said flange parts spaced from said rear wall to define a side channel on opposite sides of said central channel and located between each said flange part and said rear wall; said flange parts having horizontally aligned, opposing first holes at each of said plurality of locations; said drawbar including an arm with opposite ends; said hitch part located at one of said drawbar ends; a mounting plate located at the other of said drawbar ends; said mounting plate extending outwardly from said arm on opposite sides; said arm having a second hole alignable with said first holes in said hitch parts; said draw bar fitted into said central channel with said mounting plate fitted into said side channels; said draw bar being slidably shiftable vertically within said central channel along said flange parts; said draw bar being securable at any of said plurality of locations with a pin through aligned first and second holes in said flange parts and said arm.

* * * * *